May 28, 1929.   J. CASE   1,714,495
BUTTER CUTTER
Filed June 30, 1928
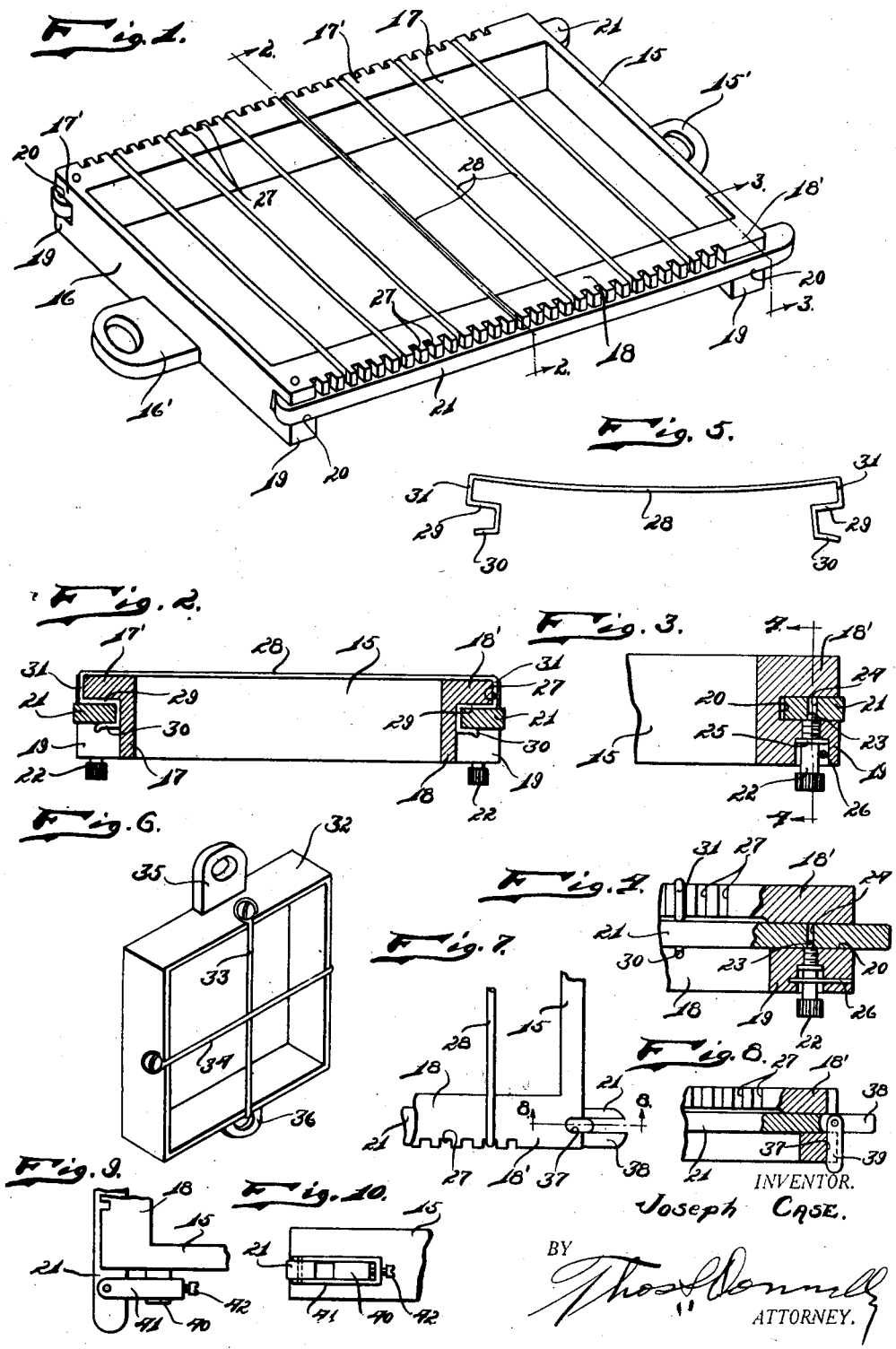

Patented May 28, 1929.

1,714,495

UNITED STATES PATENT OFFICE.

JOSEPH CASE, OF DETROIT, MICHIGAN.

BUTTER CUTTER.

Application filed June 30, 1928. Serial No. 289,409.

My invention relates to a new and useful improvement in a butter cutter and has for its object the provision of a device whereby a cake of butter may be cut into a plurality of small cakes for individual service.

It is another object of the invention to provide a device of this class which is simple in structure, economical of manufacture and highly efficient in use.

Another object of the invention is to provide a butter cutter of this class having a plurality of cutting wires, each individual and separate from the other and removable and replaceable therein independently.

Another object of the invention is the provision of a butter cutter of this class having a plurality of separate, independent cutting wires and means for locking said cutting wires on a retaining frame and stretching said wires to taut condition.

Other objects will appear hereinafter.

The invention consists in the combination and arrangement of parts hereinafter described and claimed.

The invention will be best understood by a reference to the accompanying drawings which form a part of this specification and in which, Fig. 1 is a perspective view of the invention.

Fig. 2 is a sectional view taken on line 2—2 of Fig. 1.

Fig. 3 is a fragmentary sectional view taken on line 3—3 of Fig. 1.

Fig. 4 is a fragmentary sectional view taken on line 4—4 of Fig. 3.

Fig. 5 is a side elevational view of one of the cutting wires used in the invention.

Fig. 6 is a perspective view of a quartering cutter used with the invention.

Fig. 7 is a fragmentary elevational view of a modified form of fastening member used in the invention.

Fig. 8 is a fragmentary sectional view taken on line 8—8 of Fig. 7.

Fig. 9 is a fragmentary top plan view of a modified form of fastening member used in the invention.

Fig. 10 is a fragmentary side elevational view of the fastening member.

The device comprises a frame having oppositely disposed end rails 15 and 16, each provided with a lug 15' and 16' respectively, having an opening formed therein, these lugs affording handholds for holding the device when it is being used. The end rails 15 and 16 are connected by and preferably formed integral with side rails 17 and 18 which are oppositely disposed. Projecting laterally outwardly from the upper surface of each of the side rails 17 and 18 are flanges 17' and 18' respectively, these flanges overlying an extension or boss 19 which projects outwardly from the lower surface of the end rails 15 and 16 so that a space 20 is provided between each of the bosses and the flanges 17' and 18' at the ends thereof. Pivotally mounted at one end between one of the bosses 19 and one end of the flange 17' or 18', as the case may be, is a locking bar 21. Threaded into the bosses 19 at opposite sides is a screw 22 provided with an extension 23 of reduced diameter adapted, upon swinging of the locking bar 21 to closed or operative position, for engaging in an opening 24 formed in this locking bar adjacent its free end. A collar 25 is formed on the screw 22, and projected into the end rail 15 is a pin 26 adapted to engage this collar 25 upon unthreading of the screw 22 a predetermined distance, so that the removal of the screw therefrom is prevented, while unthreading of the screw sufficiently to disengage the extension 23 from the opening 24 is permitted.

The flanges 17' and 18' are provided with a plurality of spaced notches 27, the respective notches in the flanges 17' and 18' being in alignment with each other. A cutting element formed from wire and comprising the main body 28 is provided, the end of this cutting element being doubled upon itself to provide the inwardly projecting portion 29 at each end, this inwardly projecting portion being doubled upon itself to provide a U-shaped structure 30. When the cutting element 28 is placed in position, the portion 31 of the cutting element will lie in one of the slots 27, as clearly appears in Fig. 2, the portion 29 extending inwardly in engagement with the undersurface of the flange 17' or 18'. After the cutting element has been placed in position, the locking bar will be swung to closed position shown in Fig. 2, this locking bar engaging in the U-shaped portion formed on the end of the cutting element and serving to press the cutting element inwardly of the flange at its ends, so as to stretch it taut across the frame, and thus causing it to extend in taut condition between the side rails 17 and 18. This stretching of the cutting element in taut condition by means of this locking device is an important feature as it serves to lock the cutting element securely in position, while at the same time, it is retained so that it may be easily and quickly removed.

Furthermore, by retaining it taut a clean cut of the butter is always provided.

I have illustrated a quartering device comprising a frame 32 having the cutting wires 33 and 34 extended across at right angles to each other. This frame is provided with the lugs 35 and 36.

The butter operated upon by such a cutter is generally formed in a brick and this brick is usually quartered by the quartering device, which is accomplished by pressing the frame 32 over the brick, the frame 32 being of a size to snugly fit the brick. After the quartering of the brick the frame carrying the cutting elements 28 is pressed downwardly over the brick, thus dividing the quartered sections of the brick into small pieces.

In Figs. 7 and 8 I have shown a modified form of securing means whereby the locking bar 21 may be locked in position. To this end I provide in the flanges 17' and 18' a notch 37. A locking bar is bifurcated at its free end 38 and pivoted between the prongs is a link 39 which, when the locking bar 21 is moved to closed position, may be swung into vertical position, as shown in Fig. 8, so as to engage in the notch 37, and thus securely lock the locking bar in operative or locking position.

In Figs. 9 and 10 I have shown a further modified form of securing means whereby the locking bar 21 may be locked in position. In this case I have pivotally mounted a yoke 41 on the locking bar 21 adapted to swing around in embracing relation on a boss 40 projected outwardly from the end rail. A set screw 42 serves to lock this yoke in position to retain the locking bar 21 in operative position.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A butter cutter of the class described, comprising: a frame having oppositely disposed side rails; an outwardly projecting flange on each of said side rails, said flanges being provided with a plurality of aligning spaced notches; a plurality of cutting elements extending between said side rails and engaging in aligning notches; and a swingably mounted locking bar on each of said side rails for locking said cutting elements in engagement with said notches, and stretching said cutting elements in taut condition.

2. A butter cutter of the class described, comprising: a frame having a pair of oppositely disposed side rails; an outwardly projecting flange on the upper surface of each of said side rails, each of said flanges having a plurality of spaced notches formed therein, the respective notches in one flange being in alignment with the respective notches in the other flange; end rails on said frame; projections extending outwardly from the ends of said end rails and underlying said flanges, the upper surface of said projections being spaced from the lower surface of said flanges; a locking bar pivotally connected at one end between said flange and said projection; a plurality of cutting elements engaging in aligning notches in said side rails and extending across said frame, and engageable by said locking bar upon movement of said locking bar to operative position, said cutting elements being irremovable from said frame while in engagement with said locking bar.

3. In a butter cutter of the class described, a cutting element comprising a wire doubled upon itself to provide a U-shaped structure at each end, said U-shaped structure being angularly, outwardly turned, and again angularly turned to provide a further U-shaped structure.

In testimony whereof I have signed the foregoing specification.

JOSEPH CASE.